US011767841B2

(12) United States Patent
Decook et al.

(10) Patent No.: US 11,767,841 B2
(45) Date of Patent: Sep. 26, 2023

(54) SMART PUMP FOR REMOTELY SENDING REALTIME DATA TO A SMART DEVICE

(71) Applicant: ITT MANUFACTURING ENTERPRISES LLC, Wilmington, DE (US)

(72) Inventors: Bradley Decook, Victor, NY (US); Daniel Kernan, Liverpool, NY (US)

(73) Assignee: ITT MANUFACTURING ENTERPRISES LLC, Wilmington, DE (US)

( * ) Notice: Subject to any disclaimer, the term of this patent is extended or adjusted under 35 U.S.C. 154(b) by 311 days.

(21) Appl. No.: 17/201,374

(22) Filed: Mar. 15, 2021

(65) Prior Publication Data

US 2021/0270262 A1 Sep. 2, 2021

Related U.S. Application Data

(63) Continuation of application No. 16/009,502, filed on Jun. 15, 2018, now Pat. No. 10,947,968.

(51) Int. Cl.
*F04B 51/00* (2006.01)
*G05B 19/042* (2006.01)

(52) U.S. Cl.
CPC ............ *F04B 51/00* (2013.01); *G05B 19/042* (2013.01); *G05B 2219/25257* (2013.01)

(58) Field of Classification Search
None
See application file for complete search history.

(56) References Cited

U.S. PATENT DOCUMENTS

| | | | |
|---|---|---|---|
| 6,464,464 B2 | 10/2002 | Sabini et al. | |
| 6,487,903 B2 | 12/2002 | Sabini et al. | |
| 6,564,627 B1 | 5/2003 | Sabini et al. | |
| 6,591,697 B2 | 7/2003 | Henyan | |
| 6,648,606 B2 | 11/2003 | Sabini et al. | |
| 6,776,584 B2 | 8/2004 | Sabini et al. | |
| 7,080,508 B2 | 7/2006 | Stavale et al. | |
| 7,112,037 B2 | 9/2006 | Sabini et al. | |
| 7,746,063 B2 | 6/2010 | Sabini et al. | |
| 7,788,973 B2 | 9/2010 | Quill | |
| 7,814,787 B2 | 10/2010 | Sabini et al. | |
| 7,945,411 B2 | 5/2011 | Kernan et al. | |

(Continued)

*Primary Examiner* — Octavia Davis Hollington
*Assistant Examiner* — Jermaine L Jenkins
(74) *Attorney, Agent, or Firm* — Carter, DeLuca & Farrell LLP; George Likourezos; Bret Shapiro

(57) ABSTRACT

The present invention provides wireless sensor technology seamlessly integrated into a pump system having a pump, a motor and a drive, has diagnostic and prognostic intelligence that utilizes sensor data, allows real-time condition monitoring; enables easy access to data and analytics via smart devices (i.e., smart phones and tablets); allows for easy remote monitoring (i.e., web portal) of the pump system; allows self-learning artificial intelligence (AI) built-in that adapts to changing conditions; and allows for smart pump system remote control. In operation, the present invention monitors the health and performance of the pump system that allows the user to get real-time data and intelligence virtually anywhere and anytime, as well as real-time diagnostics and prognostics, and also allows for smart control of the pump system remotely via smart device, and reduces downtime of equipment.

14 Claims, 6 Drawing Sheets

Examples of embedded wireless sensor circuit board placements:

1. Seal Sensor
2. Oil Quality Sensor
3. Tri-Axial Accelerometer (Vibration)
4. Embedded Motor Drive
5. Embedded PumpSmart Logic
6. Suction Pressure
7. Discharge Pressure
8. Temperature Sensor (Pump)
9. Temperature Sensor (Motor)
10. Wireless (BLE) Communication Module
11. DC Power Module
12. Viscosity Sensor
13. Motor Current Sensor
14. pH Monitor
15. VOC 'Sniffing' Sensor
16. Drive Shaft Phase/Position Sensor
17. Network Gateway (Web Portal)

(56) References Cited

U.S. PATENT DOCUMENTS

| | | |
|---|---|---|
| 8,154,417 B2 | 4/2012 | Hauenstein et al. |
| 8,303,260 B2 | 11/2012 | Stavale et al. |
| 9,418,543 B1 | 8/2016 | Ross et al. |
| 10,502,234 B2 | 12/2019 | Zhu et al. |
| 10,842,932 B1* | 11/2020 | Bibian .................... G08B 5/36 |
| 2002/0170349 A1 | 11/2002 | Soneda et al. |
| 2014/0379300 A1 | 12/2014 | Devine et al. |
| 2015/0378371 A1* | 12/2015 | Lange .................. B05B 7/1613 |
| | | 700/282 |
| 2018/0163730 A1 | 6/2018 | Wilds et al. |
| 2019/0317488 A1* | 10/2019 | Al-Maghlouth ..... G05B 23/024 |
| 2019/0376510 A1* | 12/2019 | Nofal ..................... F04B 49/06 |

* cited by examiner

Features of Embedded Wireless Sensor Circuit Board include:

- Seamless Embedded Sensor Technology,
- Design Pump/Motor for Sensor Integration,
- Integral Power,
- Micro-Electronics,
- Secure Wireless Communication,
- Data Collection & Analysis,
- Web Portal Access, and
- Selectable Sensor Technology (Customizable).

Embedded wireless sensor board circuit 20'

Circuits/components 20", e.g., including an electrode connector 20a, an amplifier chip 20b, an embedded microcontroller device 20c, a radio chip 20d and an antenna 20e One or more embedded sensors 20f configured to sense data in relation to the pump 32 or motor 34 on which the embedded wireless sensor board circuit 20' is placed

Figure 3B

Apparatus 100, e.g., having a smart device 100',

A signal processor or processing circuit/module 10a configured at least to:

receive wireless signaling containing information about sensed data received from embedded wireless sensor circuit boards integrated into a pump system having a pump, a motor and a drive being monitored;

determine corresponding signaling containing information about real-time health and performance of the pump system being monitored to allow a user to get real-time sensed data, intelligence, diagnostics and prognostics remotely via the smart device, based upon the signaling received; and/or provide the corresponding signaling as control or monitoring signaling to control or monitor the pump system, e.g., including a pump, a motor and/or a drive.

Other signal processor circuits/components 10b that do not form part of the underlying invention, e.g., including input/output circuits/modules, one or more memory circuits/modules, data, address and control busing architecture, etc.

Figure 5

SMART PUMP FOR REMOTELY SENDING REALTIME DATA TO A SMART DEVICE

CROSS REFERENCE TO RELATED APPLICATIONS

This application is a continuation of U.S. patent application Ser. No. 16/009,502, filed Jun. 15, 2018, entitled "A SMART PUMP FOR REMOTELY SENDING REALTIME DATA TO A SMART DEVICE", the disclosure of this applications is incorporated herein by reference in its entirety.

This application is related to, and forms part of, a family of technologies, e.g., disclosed in the following applications:

U.S. patent application Ser. No. 14/933,230, filed 5 Nov. 2015, entitled "Smart communication device or apparatus for collecting and evaluating information about equipment distributed over a large area, e.g., over a large industrial plant or oil field;"

U.S. patent application Ser. No. 14/685,134, filed 13 Apr. 2015, entitled "Sensing module for monitoring conditions of a pump or pump assembly;"

U.S. patent application Ser. No. 15/456,761, filed 13 Mar. 2017, entitled "Motor assembly for driving a pump or rotary device, having a power plane with multi-later power and control printed circuit board assembly;"

U.S. patent application Ser. No. 14/681,577, filed 8 Apr. 2015, entitled "Nodal dynamic data acquisition and dissemination;" and U.S. Pat. No. 8,154,417, issued 10 Apr. 2012, entitled "Compact self-contained condition monitoring device;"

which are all incorporated by reference in their entirety.

BACKGROUND OF THE INVENTION

1. Field of the Invention

The present invention relates to a pump system composed of a motor, embedded motor drive, control electronics and software for driving a pump; more particularly to a technique for sensing and monitoring such a pump system using one or more sensors and associated embedded firmware (F/W) logic.

2. Brief Description of Related Art

In the prior art, wired sensors attached to pump systems to monitor the health and performance of the pump system are known. However, these known techniques are expensive and complex. The number of sensors is limited due to the expense of wiring and integrating the wiring into the pump system. Viewing the sensor data is also limited to a central control center (i.e., DCS). Moreover, motor drives are typically mounted remotely in a protected area of the plant which adds complexity and expense (wiring, etc.). In view of this, there is a need in the industry for a better way to sense and monitor the health and condition of a pump system.

SUMMARY OF THE INVENTION

In summary, the present invention uses wireless sensor technology seamlessly integrated into a pump system having a pump, a motor and an embedded motor drive; has diagnostic and prognostic intelligence that utilizes sensor data; allows real-time condition monitoring; enables easy access to data and analytics via smart devices (i.e., smart phones and tablets); allows for easy remote monitoring (i.e., web portal) of the pump system; allows self-learning artificial intelligence (AI) built-in that adapts to changing conditions; and allows for smart pump system remote control.

In operation, the present invention monitors the health and performance of the pump system in a manner that allows the user to get real-time data and intelligence virtually anywhere and anytime, as well as real-time diagnostics and prognostics, and also allows for smart control of the pump system remotely via a smart device, and reduces downtime of equipment.

The system also contains built-in pump protection in case of a system failure protecting the pump from costly damage and repair. Plus, it can optimize the pump's performance by automatically calculating the best performance parameters for the pump system (% BEP). This significantly reduces operating costs.

Specific Embodiments

According to some embodiments, the present invention may include, or take the form of, a new and unique apparatus featuring:

a smart device having a signal processor or signal processing circuit/module configured to:
  receive wireless signaling containing information about sensed data received from embedded wireless sensor circuit boards integrated into a pump system having a pump, a motor and a drive being monitored; and
  determine corresponding signaling containing information about real-time health and performance of the pump system being monitored to allow a user to get real-time sensed data, intelligence, diagnostics and prognostics remotely via the smart device, based upon the signaling received.

According to some embodiments of the present invention, the apparatus may include one or more of the features, as follows:

The signal processor or signal processing circuit/module may be configured to provide the corresponding signaling as display signaling for displaying on a display of the smart device.

The signal processor or signal processing circuit/module may be configured to provide the corresponding signaling as control or monitoring signaling to control or monitor the pump system remotely via the smart phone.

The embedded wireless sensor circuit boards integrated into the pump system may include one or more of the following:
  one or more seal sensors;
  one or more oil quality sensors, including for sensing % of contaminates or fluid level;
  tri-axial accelerometers;
  an embedded motor drive;
  an embedded PumpSmart logic, including for providing pump control, pump protection or multi-pump control;
  a suction pressure sensor;
  a discharge pressure sensor;
  a pump temperature sensor;
  a motor temperature sensor, including for providing the temperature of a motor bearing and motor winding;
  a wireless communication module,
  a DC power module;
  a viscosity sensor;
  a motor current (Flux) sensor;
  a pH monitor;

a volatile organic compounds (VOC) "sniffing" sensor;
a drive shaft phase/position sensor; and/or
'a network gateway or web portal, for providing LoRaWAN, M2M communication, Wi-Fi, Low Power Cellular or sub GHz connectivity.

The apparatus includes, or take the form of, a wireless machine-to-machine network, e.g., having the smart device.

The apparatus may include the embedded wireless sensor circuit boards.

The embedded wireless sensor circuit boards may include an electronic circuit board having at least the following:
an embedded microcontroller device;
an amplifier chip;
an electrode connector;
a radio chip and
an antenna for providing the wireless signaling, and receiving the corresponding wireless signaling.

The electronic circuit board may be configured to provide seamless embedded sensor technology, data collection and analysis, web portal access and selectable or customizable sensor technology.

The embedded wireless sensor circuit boards may include, or take the form of, a surface mounted device (SMD) made or manufactured using surface-mount technology (SMT).

The apparatus may include the surface mounted device (SMD).

The surface mounted device (SMD) may include an integrated sensor configured to acquire the sensed data.

The smart device may include, or take the form of, a smart phone, a tablet, personal assistance device, a laptop, or a desktop for providing remote access to the real-time health and performance of the pump system being monitored and the real-time sensed data, intelligence, diagnostics and prognostics.

The signal processor or signal processing circuit/module may be configured to run or implement an app or application to provide the corresponding signaling as interrogation wireless signaling containing information to request one or more types of sensed data from one or more of the embedded wireless sensor circuit boards.

Advantages of the present invention include:
uses inexpensive wireless sensor technology for monitoring a pump system;
easy integration and implementation of the wireless sensor technology for monitoring a pump system;
the ability to use low power sensors for monitoring a pump system;
the ability to view sensor information via a smart phone device (i.e., a smart phone or tablet); and
the elimination of the need for the central control system.

The present invention may also take the form of a method having steps for:
receiving in a smart device having a signal processor or signal processing circuit/module wireless signaling containing information about sensed data received from embedded wireless sensor circuit boards integrated into a pump system having a pump, a motor and a drive being monitored; and
determining with the signal processor or signal processing circuit/module corresponding signaling containing information about real-time health and performance of the pump system being monitored to allow a user to get real-time sensed data, intelligence, diagnostics and prognostics remotely via the smart device, based upon the signaling received.

The method may also include steps for implementing one or more of the features set forth herein.

The present invention provides a better way to monitor the health and performance of a pump system.

The present invention also has an embedded drive which does not require any extra wiring or expense to install; instead, it is built into the motor.

BRIEF DESCRIPTION OF THE DRAWING

The drawing includes FIGS. 1-5, which are not necessarily drawn to scale:

FIGS. 3A and 3B shows examples of embedded wireless sensor circuit boards like that shown in FIG. 3.

FIG. 5 shows apparatus having a signal processor or processing module/circuit, according to some embodiments of the present invention.

DETAILED DESCRIPTION OF THE INVENTION

FIG. 1

Figure 1:
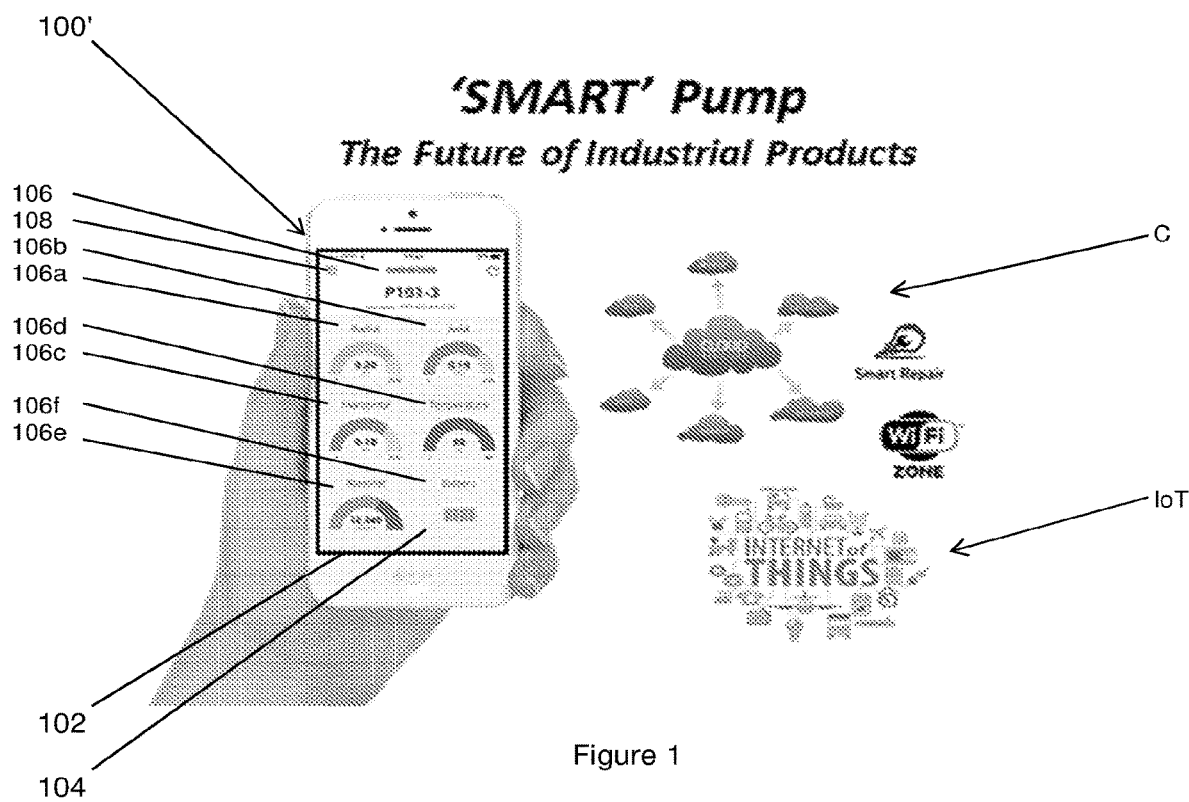
FIG. 1 shows a smart device having an app for monitoring a pump in relation to the cloud and forming part of technology based upon the Internet of Things, according to some embodiments of the present invention.

FIG. 1 shows a smart device 100 having a display 102 with an app generally indicated as 104 for monitoring a pump or pump system (FIG. 2) in relation to the cloud C and forming part of overall technology based upon the Internet of Things IoT. By way of example, FIG. 1 shows that the cloud C may be configured to provide cloud services in relation to, e.g., one or more mobile devices, one or more networks, one or more databases, one or more servers, one or more apps, and/or one or more webs. By way of example, the pump or pump system being monitored may form part of one network on the cloud C. The cloud services may include exchanging communication signaling, storing and exchanging data signaling, exchanging control signaling, etc.

By way of example, on the smart device 100 the app 104 may include a dashboard 106, e.g., for a pump P101-3, showing readings for various parameters being sensed and monitored, including a radial reading 106a, an axial reading 106b, a horizontal reading 106c, a temperature reading 106d, a runtime reading 106e and a battery reading 106f. The user can use the dashboard 106 to monitor remotely via the cloud C the readings for the various parameters being sensed and displayed on this dashboard. The app 104 may also include one or more other dashboards, e.g., accessed via a dropdown menu 108 for sensing and displaying other parameters having other readings, parameters, etc.

FIG. 2

Figure 2:
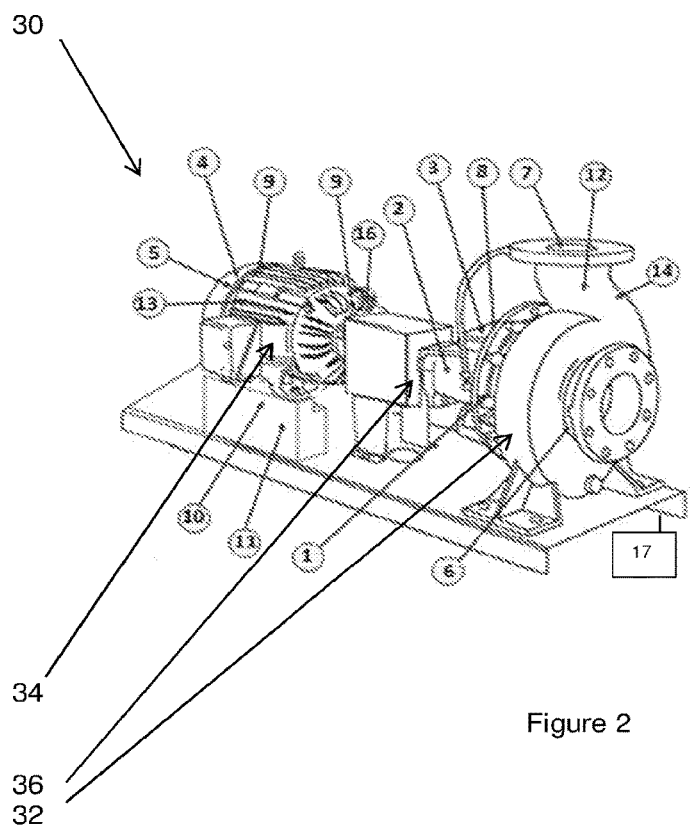
FIG. 2 shows a pump system having a motor for driving a pump, and also having examples of embedded wireless sensor circuit board placements on the motor and the pump, according to some embodiments of the present invention.

FIG. 2 shows a pump system 30 having a pump 32 driven by a motor 34, and also having examples of placements for associated embedded wireless sensor circuit boards on the pump 32 and the motor 34, identified as follows:
1. Seal Sensor (Pump),
2. Oil Quality Sensor (Pump),
  a. % Contaminates (i.e. water & metal debris), and
  b. Fluid Level, etc.,
3. Tri-Axial Accelerometer (Vibration)—pump,
4. Embedded Motor Drive (Motor),
5. Embedded PumpSmart Logic (Motor),
  a. SmartFlow for controlling the pump's flow,
  b. Multi-Pump Control, and
  c. Pump Protection, e.g., including run dry protection, etc.,
6. Suction Pressure sensor (Pump),
7. Discharge Pressure sensor (Pump),
8. Temperature Sensor (Pump),
9. Temperature Sensor (Motor),
  a. Motor Bearings, and
  b. Motor Windings,
10. Wireless (BLE) Communication Module (Motor),
11. DC Power Module (Motor),
12. Viscosity Sensor (Pump),
13. Motor Current (Flux) Sensor (Motor),
14. pH Monitor (Pump),
15. VOC 'Sniffing' Sensor (not shown),
16. Drive Shaft Phase/Position Sensor (Motor),
17. Network Gateway (Web Portal),
  a. LoRaWAN,
  b. M2M Communication,
  c. Wi-Fi,
  d. Low Power Cellular and
  e. Sub GHz.

The scope of the invention is not intended to be limited to any particular placement or placements for the associated embedded wireless sensor circuit boards; and embodiments are envisioned, and the scope of the invention is intended to include, using other placements than that shown in FIG. 2.

Figure 3:
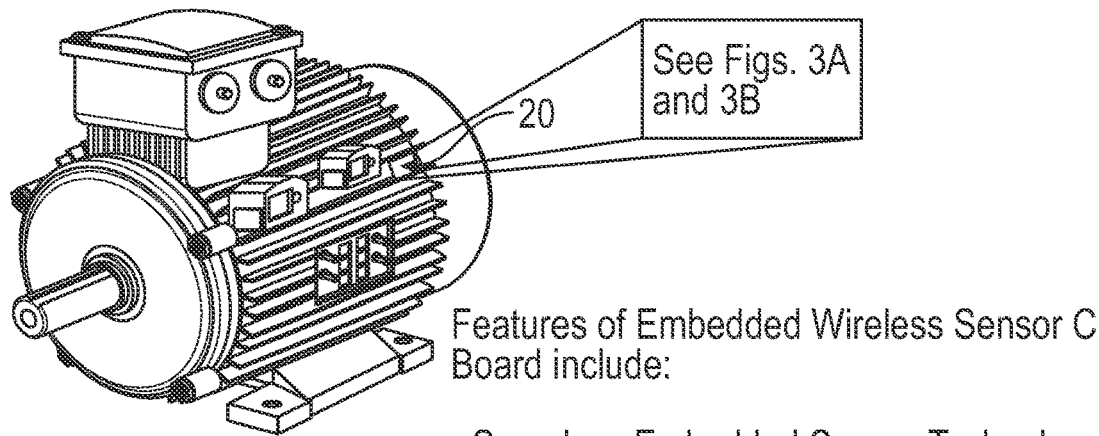
FIG. 3 shows a motor for driving a pump having an embedded wireless sensor circuit board placement, according to some embodiments of the present invention.
Figure 3A:
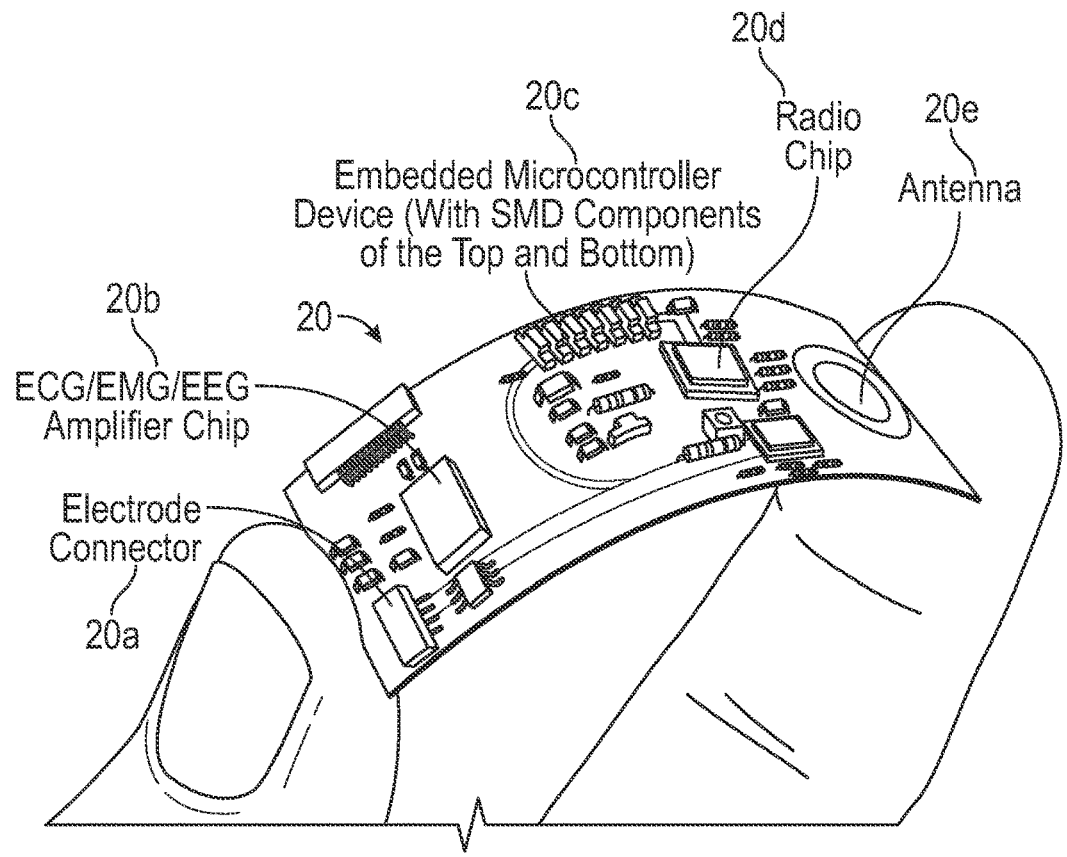

FIGS. 3, 3A and 3B

FIG. 3 shows the motor 34 for driving the pump 32, as well as examples of features of embedded wireless sensor circuit board shown in FIGS. 3A and 3B. By way of example, the features may include the following:
  Seamless Embedded Sensor Technology, e.g., using surface mounted technology (SMT),
  Pump/Motor Design for Sensor(s) Integration,
  Integral Power, e.g. for powering the electronics of the motor,
  Micro-Electronics, e.g. for controlling the motor, as well as implementing the sensor technology,
  Secure Wireless Communication, e.g. for providing a communication link between the embedded wireless sensor circuit board 20 and the smart device 100,
  Data Collection and Analysis onboard the embedded wireless sensor circuit board 20, (It is noted that according to some embodiments data storage and analytics may take place or be implemented in the Cloud. Limited memory will be needed and available within the on-board electronics to store some data to perform some limited analytics.)
  Web Portal Access, e.g. for providing a communication link between the embedded wireless sensor circuit board 20 and a proprietary website, and
  Selectable Sensor Technology (Customizable), e.g., for adapting to customer needs and requests).

By way of example, FIG. 3A shows an embedded wireless sensor circuit board 20 having an electrode connector 20a, e.g., for coupling the circuit board to corresponding electrodes of another circuit board, device or sensor, e.g., including an amplifier chip 20b (ECG/EMG/EEG) for amplifying signaling associated with the circuit board, an embedded microcontroller device 20c (with SMD components of the top and bottom) for controlling the circuit board and processing suitable signaling associated with the circuit board, a radio chip 20d for processing radio signaling to/from the circuit board, and an antenna 20e for transmitting/receiving the radio signaling to/from the circuit board. By way of example, for each sensor placement like that shown in FIG. 2 the embedded wireless sensor circuit board 20 may be coupled to one or more sensors either via a wireless signal coupling, or via a direct hardwire coupling.

By way of further example, FIG. 3B shows an embedded wireless sensor circuit board 20' having circuits/components 20", such as the electrode connector 20a, the amplifier chip 20b, the embedded microcontroller device 20c, the radio chip 20d and the antenna 20e, as well as one or more embedded sensors 20f for sensing data, e.g., consistent with that set forth herein. By way of example, see the different types and kinds of sensors for the placements shown FIG. 2. In this case, the embedded sensors 20f may physically form part of the embedded wireless sensor circuit board 20'.

As one skilled in the art would appreciate, surface-mount technology (SMT) is a method for producing electronic circuits in which the components are mounted or placed directly onto the surface of printed circuit boards (PCBs). An electronic device so made is called a surface mounted device (SMD). According to some embodiments, the embedded wireless sensor circuit boards may take the form of a surface mounted device (SMD) produced by, or made using, surface-mount technology (SMT).

The scope of the invention is not intended to be limited to any particular feature or features for the associated embedded wireless sensor circuit boards; and embodiments are envisioned, and the scope of the invention is intended to include, using other features than that shown in FIG. 3A.

FIG. 4

Figure 4:
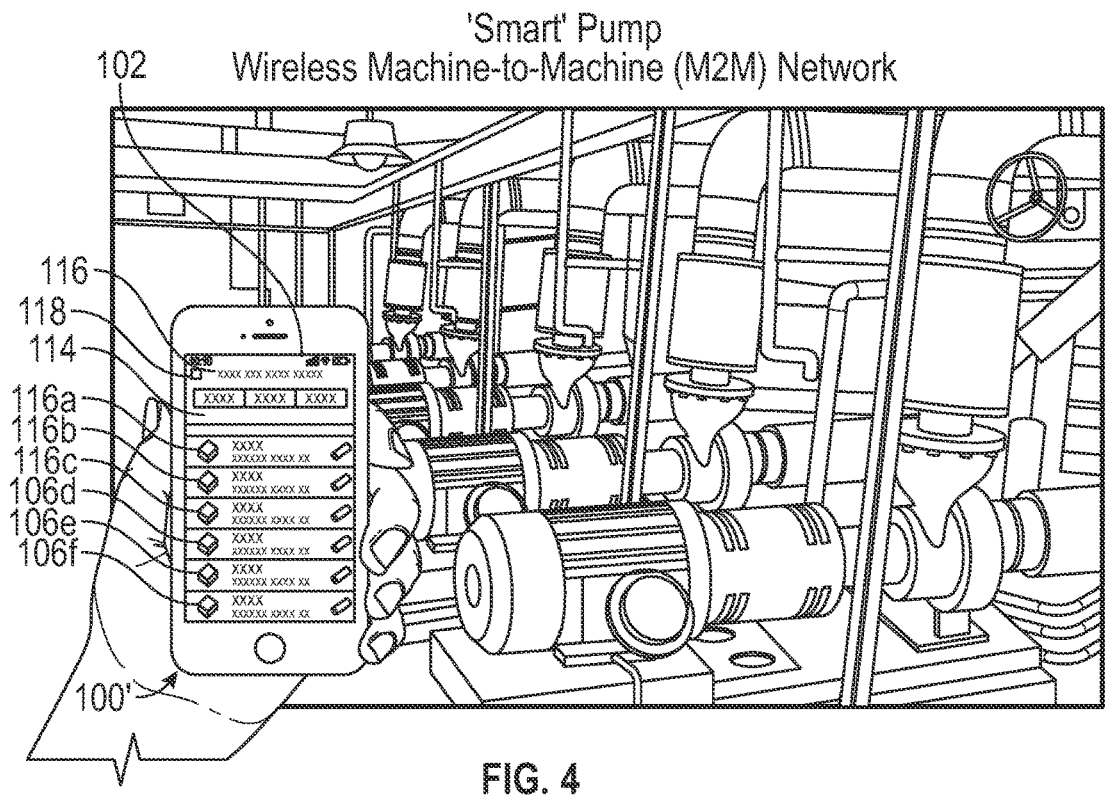
FIG. 4 shows a smart device having an app for monitoring one or more pumps arranged in a wireless machine-to-machine (M2M) network, according to some embodiments of the present invention.

FIG. 4 shows the smart device 100 having an app for monitoring one or more pumps arranged in a wireless machine-to-machine (M2M) network, according to some embodiments of the present invention.

By way of example, the smart device 100 has an app 114 to scan for devices displayed on the screen 102 that may include a dashboard 116, showing, e.g., iAlert devices in range, including icons for pump P101-A labeled 116a, i-Alert 3 labeled 116b, i-Alert 2 labeled 116c, i-Alert 1 labeled 116d, i-Alert 8C 1805 labeled 116e and a test unit labeled 116f. The user can use the dashboard 116 to monitor remotely via the cloud C the i-Alert device in range for the various parameters being sensed and displayed on this dashboard. In operation, the user may see a warning displayed on the icon, e.g., such as "vibration, Vib warning" indicating that pump P101-A has a vibration warning. The icons also include an indication of signal strength using increasingly scaled vertical bars as shown, e.g., where the signal strength for the pump P101-A shows two bar signal strength, while the signal strength for the i-Alert 3 labeled 116b is no bars, etc.

The app 114 may also include one or more other dashboards, e.g., accessed via a dropdown menu 118 for sensing and monitoring other parameters having other indications, etc.

Figure 4A:
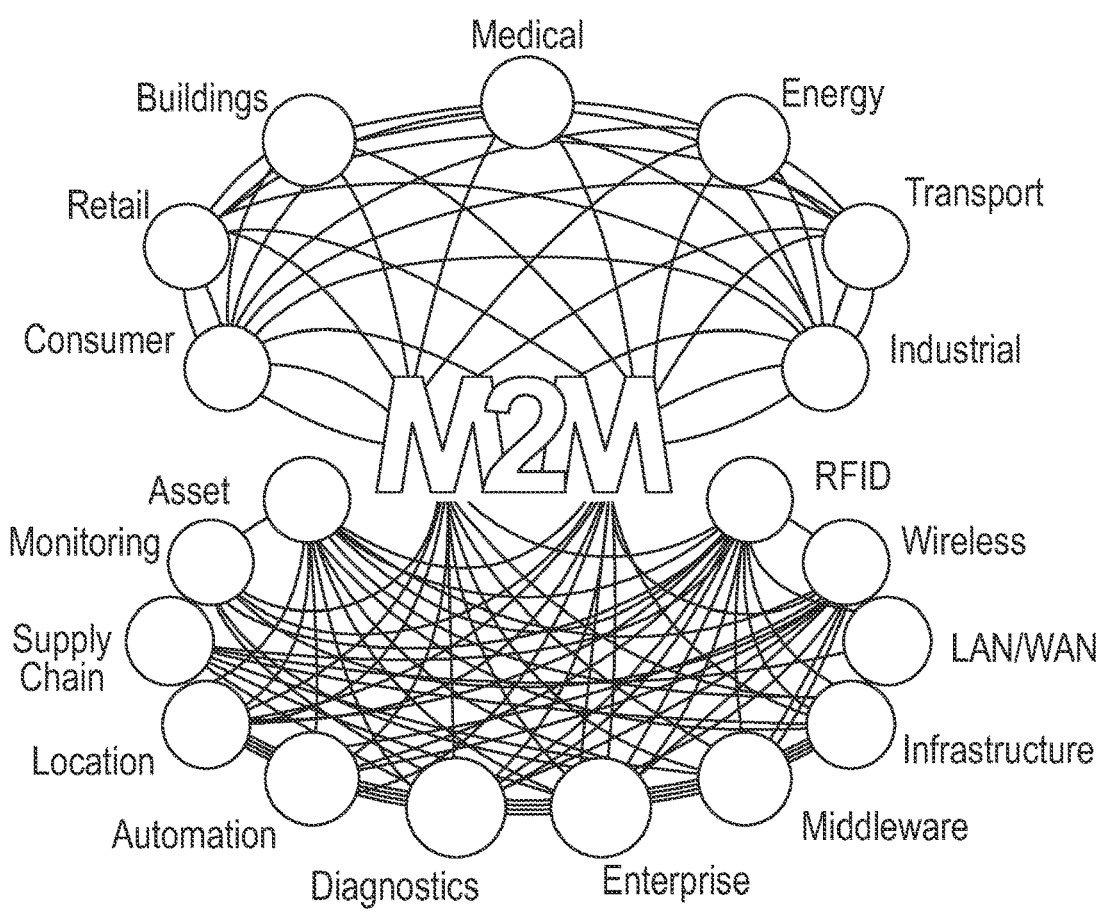
FIG. 4A shows an example of a wireless machine-to-machine (M2M) network and examples of various technologies forming part of the same.

FIG. 4A shows an example of a wireless machine-to-machine (M2M) network and examples of various technologies forming part of the same. According to some embodiments, the apparatus according to the present invention may be implement as part of such a wireless machine-to-machine (M2M) network.

FIG. 5: The Basic Apparatus 200, Including a Pump System

By way of example, FIG. 5 shows the present invention in the form of apparatus generally indicated as 200 (see FIGS. 1, 4 and 5) featuring:
  the smart device 100 having a signal processor or signal processing circuit/module 10a configured to:
    receive wireless signaling containing information about sensed data received from one or more embedded wireless sensor circuit boards 20 integrated into a pump system 30 having a pump 32, a motor 34 and a drive 36 being monitored; and
    determine corresponding signaling containing information about real-time health and performance of the pump system 30 being monitored to allow a user to get real-time sensed data, intelligence, diagnostics and prognostics remotely via the smart device 100, based upon the signaling received.

By way of example, the signal processor or signal processing circuit/module 10a may be configured to provide the corresponding signaling as display signaling for displaying on a display of the smart device.

By way of further example, the signal processor or signal processing circuit/module may be configured to provide the corresponding signaling as control or monitoring signaling to control or monitor the pump system remotely via the smart phone.

By way of example, the functionality of the signal processor 10a may be implemented using hardware, software, firmware, or a combination thereof. In a typical software implementation, the signal processor or signal processing module 10a would include one or more microprocessor-based architectures having, e. g., at least one processor or microprocessor, random access memory (RAM) and/or read only memory (ROM), input/output devices and control, and data and address buses connecting the same, and/or at least one input processor and at least one output processor. A person skilled in the art would be able to program such a microcontroller (or microprocessor)-based implementation to perform the functionality described herein without undue experimentation. The scope of the invention is not intended to be limited to any particular implementation using technology either now known or later developed in the future. The scope of the invention is intended to include implementing the functionality of the signal processor as stand-alone processor or processor module, as separate processor or processor modules, as well as some combination thereof.

By way of example, after reading the instant patent application, one skilled in the art would appreciate without undue experimentation how to implement the signal processor 10a to receive the signaling containing information about sensed data received from embedded wireless sensor circuit boards integrated into a pump system having a pump, a motor and a drive being monitored. The implementation may include the signal processor 10a cooperating, or working in conjunction with, the input/output module forming part of the other component or circuitry forming part of element 10b.

By way of further example, after reading the instant patent application, one skilled in the art would appreciate without undue experimentation how to implement the signal processor 10a to determine the corresponding signaling containing information about the real-time health and performance of the pump system being monitored to allow a user to get real-time sensed data, intelligence, diagnostics and prognostics remotely via the smart device.

The apparatus 200 may also include one or more other modules, components, etc. generally indicated as 10b for implementing other functionality associated with the apparatus, but that does not form part of the underlying invention and is not described in detail.

Other ITT Pump Monitoring Technology

By way of example, the present invention may also be used in conjunction with other pump monitoring technology, as follows:
  ITT's oil quality sensor technology disclosed in U.S. Pat. Nos. 7,788,973 and 7,814,787;
  ITT's Embedded PumpSmart logic disclosed in U.S. Pat. Nos. 6,464,464; 6,487,903; 6,564,627; 6,591,697; 6,648,606; 6,776,584; 7,080,508; 7,112,037; 7,746,063; 7,945,411; 8,303,260, which all relate to techniques involving sensor-less SmartFlow, intelligent multi-pump control, and sensor-less pump protection;
  See ITT's Motor assembly for driving a pump or rotary device, having a power plane with multi-later power and control printed circuit board assembly, e.g., disclosed in the aforementioned U.S. patent application Ser. No. 15/456,761, filed 13 Mar. 2017; and
  ITT's motor flux sensors disclosed in patent application Ser. No. 15/648,855, filed 13 Jul. 2017; and patent application Ser. No. 15/648,838, filed 13 Jul. 2017.
  All of the aforementioned patents and patent applications disclosed herein are incorporated herein by reference.

The real-time health and performance of the pump system being monitored, as well as the real-time sensed data, intelligence, diagnostics and prognostics related to the pump system being monitored, may include, or take the form of, implementations and/or adaptations of the aforementioned pump monitoring technology set forth above, e.g., including implementations and/or adaptations that form part of signal processing performed on or by the embedded wireless sensor circuit boards.

THE SCOPE OF THE INVENTION

It should be understood that, unless stated otherwise herein, any of the features, characteristics, alternatives or modifications described regarding a particular embodiment herein may also be applied, used, or incorporated with any other embodiment described herein. Also, the drawings herein are not drawn to scale.

Although the invention has been described and illustrated with respect to exemplary embodiments thereof, the foregoing and various other additions and omissions may be made therein and thereto without departing from the spirit and scope of the present invention.

What is claimed is:

1. A system for reducing downtime of an apparatus, the system comprising:
   a module storing a set of instructions which, when processed by at least one processor executing an artificial intelligence algorithm, predicts a fault condition of the apparatus based on information received from one or more real sensors of the apparatus, wherein at least one of the one or more real sensors is a surface mounted device (SMD) mounted on the apparatus; and
   a transmitter in operative communication with the apparatus, the transmitter configured to transmit at least one instruction to the apparatus, for remotely controlling the apparatus based on the fault condition predicted by the module.

2. The system of claim 1, wherein the apparatus includes at least one of a pump, a motor, or a drive.

3. The system of claim 1, wherein the module is part of a smart device selected from the group consisting of a smart phone, a tablet, personal assistance device, a laptop, or a desktop.

4. The system of claim 1, wherein the one or more real sensors include one or more of:
   an oil quality sensor, including for sensing % of contaminates or fluid level;
   a tri-axial accelerometer;
   a suction pressure sensor;
   a discharge pressure sensor;
   a pump temperature sensor;
   a motor temperature sensor, including for providing the temperature of a motor bearing and motor winding;
   a viscosity sensor;
   a motor current (Flux) sensor;
   a pH monitor;
   VOC "sniffing" sensor; or
   a drive shaft phase/position sensor.

5. The system of claim 1, wherein at least one of the one or more real sensors is integrated into the apparatus.

6. The system of claim 1, the information received from the apparatus is real-time sensed data.

7. A method for real time condition monitoring of an apparatus, the method comprising:
   receiving information via a gateway from at least one sensor mounted on the apparatus;
   analyzing the received information to provide real-time condition monitoring of the apparatus;
   displaying, on a display, information related to the real-time condition monitoring of the apparatus; and
   transmitting an instruction to the apparatus to remotely control the operation of the apparatus based on the displayed information related to the real-time condition monitoring.

8. The method of claim 7, wherein receiving information includes receiving information from one or more real sensors.

9. The method of claim 7, wherein receiving information includes receiving real-time sensed data.

10. A computing device comprising a processor configured to execute programmable instructions to perform at least the following:
    receive real time sensed data from at least one sensor surface mounted on an apparatus;
    determine, using the real time sensed data, a prognosis of the apparatus; and
    generate a control signal to control the apparatus based on the determined prognosis,
    wherein the sensed data is routed via a gateway connecting the at least one sensor to a cloud of a network, and
    wherein the sensed data is further routed from the cloud to the computing device.

11. The device of claim 10, wherein the apparatus includes at least one of a pump, a motor, or a drive.

12. The device of claim 10, wherein the computing device is part of a smart device selected from the group consisting of a smart phone, a tablet, personal assistance device, a laptop, and a desktop.

13. The device of claim 10, wherein the gateway provides LoRaWAN, M2M communication, Wi-Fi, Low Power Cellular or sub GHz connectivity.

14. The device of claim 10, wherein the programmable instructions are part of an artificial intelligence software platform.

* * * * *